Patented Mar. 13, 1923.

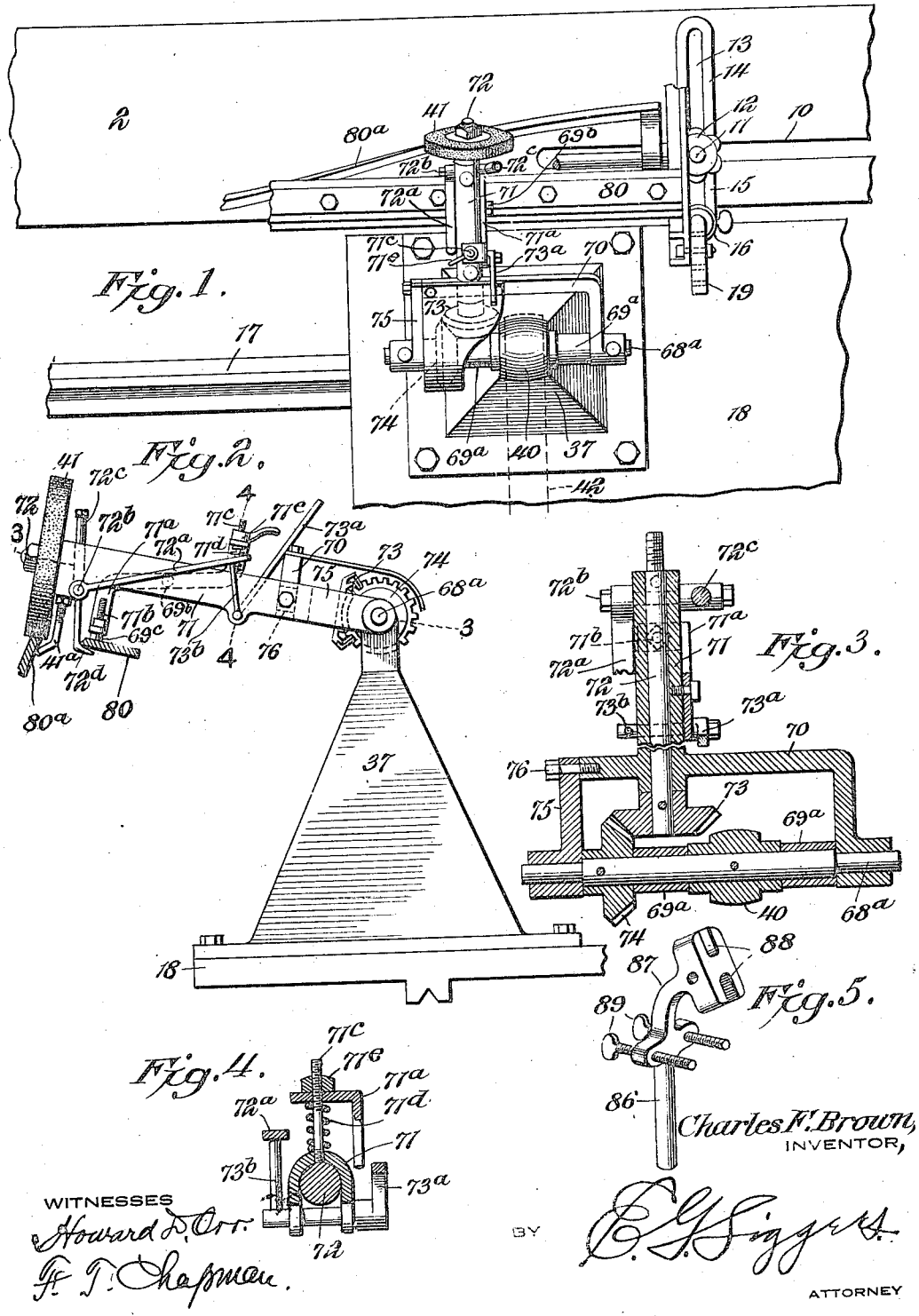

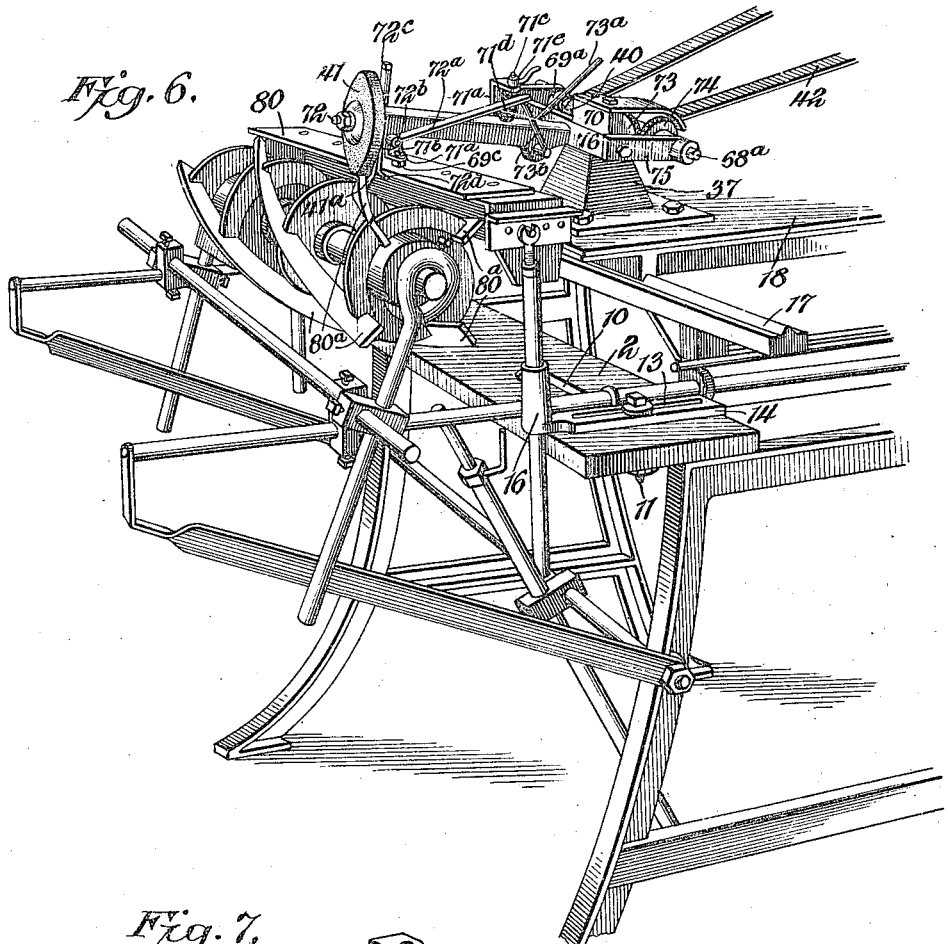
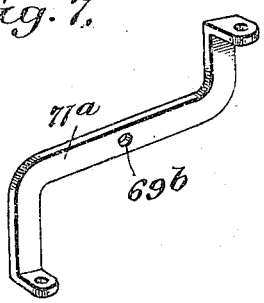

1,448,519

UNITED STATES PATENT OFFICE.

CHARLES FRANCISCO BROWN, OF GREENEVILLE, TENNESSEE.

LAWN-MOWER SHARPENER.

Application filed January 14, 1922. Serial No. 529,275.

*To all whom it may concern:*

Be it known that I, CHARLES F. BROWN, a citizen of the United States, residing at Greeneville, in the county of Greene and State of Tennessee, have invented a new and useful Improvement in Lawn-Mower Sharpeners, of which the following is a specification.

This invention has reference to lawn mower blade sharpeners, and is an improvement on the lawn mower sharpener shown and described in application No. 453,333, filed by me on March 24, 1921.

In accordance with the invention the blades of the lawn mower are dismounted, and an abrasive or grinding wheel is supported in such relation to the cutter blades that the abrasive or grinding wheel is made to travel over the blades.

Provision is made for supporting the stationary cutter, removed from the lawn mower assembly, and to use said stationary cutter as a guide in order that both the stationary and rotary cutters may be held in related positions, whereby they will have the proper angular position of their cutting edges with respect to one another, that they should have in the assembled lawn mower.

In accordance with the invention, clamping devices are employed for gripping the stationary blade, and guide devices are used, for engaging the rotary blade assembly in order to maintain the proper relation between the abrasive wheel and said rotary blades.

A full and complete understanding of the invention may be obtained from a consideration of the following detailed description taken in connection with the accompanying drawing forming a part of this specification, it being understood that while the drawing shows a practical form of the invention, the latter is not confined to strict conformity therewith, but may be changed or modified so long as such changes or modifications mark no material departure from the salient features of the invention, as specifically pointed out in the appended claims.

In the drawing:
Figure 1 is a plan view of a portion of a sharpening machine adapted for receiving the whole lawn mower excepting the operating handle and the roller.

Figure 2 is an end elevation of that portion of the sharpening machine mounted on the carriage.

Figure 3 is a section on the line 3—3 of Figure 2.

Figure 4 is a section on the line 4—4 of Figure 2.

Figure 5 is a detail view of one of the fixed blade holders.

Figure 6 is a perspective view of a machine embodying the invention; and

Figure 7 is a detail in perspective of one of the levers used to guide the rotary cutter bar during grinding.

Referring to the preferred embodiment of the invention disclosed in the drawing, there is shown a table or work support 2 which may be considered as of any suitable shape and construction and not necessarily confined to the particular arrangement indicated. The table may be considerably elongated so as to accommodate various makes of lawn mowers to be sharpened.

The work support 2 constitutes means whereby an emery or similar sharpening or grinding wheel may be rotated in engagement with a cutter blade 80, which is the stationary blade of the lawn mower. Also carried by the work support 2, as best shown in Figure 6, is the rotary cutter of a lawn mower having the usual spiral blades 80$^a$.

Adjacent to the work support 2 is an elongated track 17 upon which moves a carriage 18 having an extent of travel corresponding to the length of the lawn mower, and appropriately shaped to reciprocate lengthwise of the machine frame. Mounted on the carriage 18 is a pedestal 37 which may be of pyramidal shape, although such particular conformation is not obligatory, but is to be preferred because the upper end of the pedestal 37 is raised to a sufficient height for the purposes of the invention, without causing undue enlargement. At the top of the pedestal 37 is mounted a shaft 68$^a$ carrying a pulley 40 and a bevel pinion 74, and also carrying spacing sleeves 69$^a$. The shaft 68$^a$ is journaled in yoke members 70 and 75, the yoke being formed in two parts held together by a screw 76 extending through one end of the yoke member 75. The yoke member 70 has a lateral extension 71, in which is journaled a spindle 72 carrying at one end a bevel pinion 73 meshing with the pinion 74, and at the other end provided with screw-threads to receive the abrasive or grinding wheel 41 held in place thereon by a nut or any other suitable means.

The shaft 68$^a$ is driven by means of a belt 42 engaging the pulley 40, whereby the shaft 68ª imparts motion to the bevel gear 74 and thence to the bevel gear 73, and to the spindle 72, driving the abrasive or grinding wheel 41 which may be considered as adjusted into engagement with one of the blades 80ª. In the meantime the carriage 18 is caused to travel lengthwise of the support 2, thereby moving the abrasive wheel 41 along the support 2, so as to take an appropriate cut from the blade 80ª.

The work support 2 is provided with a longitudinal slot 10 parallel with one long edge of the support 2, which slot is sufficiently elongated to provide for a considerable extent of adjustment of the work holder, which will now be described.

The slot 10 is traversed by a bolt 11 to which is applied a clamp nut 12 said bolt 11 traversing an elongated slot 13 in a foot or base 14 of a bracket 15 carrying at one end a socket member 16, designed to receive a work holder, in turn to receive and secure the blade assembly of the lawn mower, all as shown in the aforesaid application No. 453,333.

When it is desired to grind the blades without dismantling the lawn mower further than removing the handle and usual roller, supporting arms 19 are mounted in brackets 15, and in turn are made fast to that part of the lawn mower frame from which the roller was removed.

The grinding wheel 41 is sufficiently elevated, with respect to the work support 2, to bring the grinding wheel in proper overhanging position with respect to the blades 80ª.

In order to guide the assembly of cutter bar blades in proper relation to the grinding wheel, and hold the wheel down to its work, there is provided an angle lever 71ª mounted on the frame 71, said angle lever having a pivot 69ᵇ on the frame 71. The angle lever carries at one end a headed screw 71ᵇ, also carrying a jam nut 69ᶜ, whereby the headed screw 71ᵇ may be locked in position, and constitutes an adjustable stop member for clamping or holding the stationary cutter blade 80 against the bent end 72ᵈ of a pin 72ᶜ, carried by a rock shaft 72ᵇ on one end of a lever 72ª, mounted on the frame 71.

The angle lever 71ª at the end remote from the screw 71ᵇ is provided with another set screw 71ᶜ, to which is applied a thumb nut 71ᵉ, the spring 71ᵈ being compressed by the thumb nut 71ᵉ, whereby the tension of the spring 71ᵈ may be adjusted at will, so as to cause the screw 71ᵇ to clamp the cutter blade 80 against the bent end 72ᵈ of the pin 72ᶜ.

Also mounted on the frame 71 is a rock arm 73ᵇ having at the other side an angle extension 73ª, the arm 73ᵇ being engageable under the arm 72ª and operable by reason of the arm 73ª, at will.

Fast to the frame 71 is the threaded angle pin 41ª (Fig. 2) serving as an adjustable back stop for the cutter blade 80ª, holding said cutter blade 80ª at the proper angle to the grinding wheel 41, to give to the cutter blade 80ª the proper bevel. This pin 41ª bears against the blade and maintains it underneath the grinding wheel when the carriage is in motion.

The cutter blade 80 which is held between the angle extension 72ᵈ of the pin 72ᶜ and the set-screw 71ᵇ, serves to hold the grinding wheel in engagement with the cutter blade 80ª, and as the carriage 18 moves along, the assembly of cutter blades 80ª is caused to be rotated by the contact of the finger 41ª with the side of the blade 80ª.

To support the stationary cutter bar 80, while being sharpened, such cutter bar is removed from the lawn mower and for it there is provided a cutter bar holder shown separately in Figure 5. This holder has a pin extension 86 to enter the socket 16. there being two such holders to carry the opposite ends of the stationary cutter bar. Each of these holders has a head 87 with oppositely disposed recesses 88, and set-screws 89.

It is to be noted that the grinding of the blades and the presentation of said blades to the grinding element is automatic as in the aforesaid application for Letters Patent, and while an electric motor is preferred as the prime mover, because particularly adapted for the purpose, other prime movers may be employed.

What is claimed is:

1. In a lawn mower sharpener, means for supporting both the rotary and the stationary straight cutters when assembled, means for sharpening the blades of the cutters, means to cause the sharpening means to travel longitudinally of the cutter blades, and means engaging with the straight cutter of the lawn mower and adapted to move along said cutter as the sharpening means travels over the rotary spiral cutters, whereby the sharpening means is held against the work.

2. In a lawn mower sharpener, means for supporting both the rotary and the stationary straight cutters when assembled, means for sharpening the blades of the cutters, means to cause the sharpening means to travel longitudinally of the cutter blades, means engaging with the straight cutter of the lawn mower and adapted to move along said cutter as the sharpening means travels over the rotary spiral cutters, whereby the sharpening means is held against the work, and means engaging with the spiral cutter blade which is being sharpened and holding said blade against the sharpening means during travel thereof by causing the rotary cutter to rotate on its support.

3. In a lawn mower sharpener, means for supporting the rotary and stationary cutters when assembled, means for engaging the stationary cutter bar, a rock lever having means for engaging the stationary cutter bar, a set-screw for determining the location of the grinding means with relation to the rotatable cutter bars, and means cooperating with the stationary cutter bar engaging means for holding the grinding wheel in said operative relation to the cutter bars.

4. In a lawn mower sharpener, means for supporting the rotary and stationary cutters when assembled, means for grinding the edges of the cutters, a rock lever having means at one end for engaging the stationary cutter bar of the lawn mower, elastic means at the other end of the rock lever for adjusting the degree of engagement of the rock lever with the stationary cutter bar, another rock lever having means for engaging the stationary cutter bar to move the latter into engagement with the first named rock lever to clamp the cutter bar, and a third rock lever in position to engage the second named rock lever to clamp the several rock levers in engagement with the cutter bar.

5. In a lawn mower sharpener, the combination with a fixed support for the rotary cutters, a frame, a grinding wheel mounted thereon, and a pin carried by the frame and having its lower end bent outwardly beneath said wheel to engage a rotary cutter of the lawn mower for maintaining the cutter bar in position against the grinding wheel.

6. In a lawn mower sharpener, the combination with a frame carrying a grinding wheel, and means to support the knife assembly of the mower, of a rock lever carried by the grinder frame and having means to engage the upper side of the stationary cutter bar, and a second rock lever carried by the grinder frame and having means to engage the under side of said cutter bar, whereby the grinder frame is held in the desired position.

7. In a lawn mower sharpener, the combination with means to support the knife assembly of the mower, of a frame, a grinding wheel mounted thereon, rockable means to engage with the upper side of the stationary cutter bar of the lawn mower, another rockable means to engage with the underside of the said cutter bar to clamp the cutter bar in cooperation with the first-named rockable means, and means for operating the second named rockable means to move the same into and out of engagement with said cutter bar.

8. In a lawn mower sharpener, a support for the mower, a reciprocatory carriage, grinding means supported on the carriage, means on the grinder support and engaging with the blades for rotating the rotary blade assembly upon the progressive movement of the grinding means lengthwise of the blades, and means for slidably connecting the grinding means to the stationary cutter blade of the mower to maintain the grinding means and blades in proper relation for sharpening.

9. In a lawn mower sharpener, a support for the lawn mower, a grinder, a grinder support, means causing said grinder support to travel, means mounted on the grinder support for clamping the stationary blade of the lawn mower to maintain the grinder and rotary blade assembly in sharpening relation, and operator controlled means for releasing said clamping means.

10. In a lawn mower sharpener, a reciprocable carriage, a pedestal carried thereby, means for supporting the rotatable blade assembly of the lawn mower, and means for causing the rotation thereof upon reciprocation of the carriage, an arm pivotally mounted on the pedestal and overhanging the rotatable blade assembly, a grinder on the overhanging arm located to engage one of the blades, a guide carried by the overhanging arm adjacent to the grinder, and means for supporting the arm at the grinding end by the stationary cutter blade of the lawn mower.

11. In a lawn mower sharpener, a reciprocable carriage, a rockable yoke arm mounted at one end on the carriage, a spindle carried by and traversing the yoke arm, a gear drive for one end of the spindle, a grinding wheel on the other end of the spindle, clamping means on the yoke arm adapted to engage the stationary cutter blade of the lawn mower, and means on the yoke arm for engaging a chosen one of the assembly of rotatable cutter blades of the lawn mower to cause them to be rotated by the reciprocation of the carriage.

12. In a lawn mower sharpener, clamping means for utilizing the stationary blade of the lawn mower as a guide, a rockable yoke provided with an adjustable clamp member for the cutter blade, and another clamp member coacting with the first named clamp member for locking both clamp members together upon the stationary blade.

13. In a lawn mower sharpener, the combination with a reciprocable carriage, a shaft thereon having means for driving it, a grinding wheel carried by the carriage and geared to the shaft in position to engage the cutting blades of a rotatable blade assembly mounted on the carriage, means for mounting the stationary cutter bar of the lawn mower on the carriage, and clamping means for engaging the stationary cutter bar, to hold the grinding wheel in operative relation to the assembly of rotatable blades.

14. In a lawn mower sharpener, the combination with a reciprocable carriage, a shaft thereon having means for driving it, a grinding wheel carried by the carriage and geared to the shaft in position to engage the cutting blades of a rotatable blade assembly mounted on the carriage, means for mounting the stationary cutter bar of the lawn mower on the carriage, clamping means for engaging the stationary cutter bar to hold the grinding wheel in operative relation to the assembly of rotatable blades, and means mounted on the carriage and engaging with the blade which is being operated upon by the grinding wheel, to effect the rotation of said blade, said means contacting with the blade beneath said grinding wheel to maintain the blade in position.

In testimony that I claim the foregoing as my own, I have hereto affixed my signature.

CHARLES FRANCISCO BROWN.